United States Patent [19]

Noss

[11] Patent Number: 5,280,719
[45] Date of Patent: Jan. 25, 1994

[54] MEASUREMENT OF ROAD ROUGHNESS

[75] Inventor: Per M. Noss, Oslo, Norway

[73] Assignee: Veidirektoratet, Veglaboratoriet, Oslo, Norway

[21] Appl. No.: 613,553

[22] PCT Filed: May 11, 1989

[86] PCT No.: PCT/NO89/00046

§ 371 Date: Jan. 14, 1991

§ 102(e) Date: Jan. 14, 1991

[87] PCT Pub. No.: WO89/11001

PCT Pub. Date: Nov. 16, 1989

[30] Foreign Application Priority Data

May 13, 1988 [NO] Norway .................................. 882098

[51] Int. Cl.$^5$ .............................................. G01B 7/28
[52] U.S. Cl. ........................................ 73/146; 73/105
[58] Field of Search ........................... 73/146, 105, 597; 367/104, 106, 103

[56] References Cited

U.S. PATENT DOCUMENTS 4,048,849  9/1977  Gocho et al. ........................... 73/105

Primary Examiner—Donald O. Woodiel
Attorney, Agent, or Firm—Wenderoth, Lind & Ponack

[57] ABSTRACT

The present invention relates to a method and apparatus for measuring roughness along a surface (II) of a road or an airport runway in the driving direction. A long bar (I) has a number of ultrasound transducers (1-17) directed down toward the surface (II) of the road. The bar (I) is located e.g. in a carriage trailing behind a vehicle, at a suitable distance (for instance 20 cm) above the road surface (II). During motion, ultrasound pulses are simultaneously emitted form all transducers (1-17) for a subsequent recording of echoes from the road surface (II) with the same transducer, in order to obtain a recording of the distance between the bar and the road surface for each particular transducer. The measurement is repeated when the bar (I) has moved a distance equal to an integral multiple of the distance between two neighboring transducers, in such a manner that a number of the previously measured spots are measured once more, i.e. an overlap technique is used. The measurements are recorded in the vehicle and are data processed at a later time for presentation of e.g. an elevation profile along the completed drive distance measured.

14 Claims, 2 Drawing Sheets

MEASUREMENT OF ROAD ROUGHNESS

BACKGROUND OF THE INVENTION

1. Field of the Invention

The present invention relates to a method and an apparatus for measuring roughness along the surface of a traffic area, e.g. a road or an airport runway.

More specifically, the invention concerns measuring the longitudinal dimension of the road, i.e. along a "wheel track", and not transverse to the road (for instance in order to measure the transverse profile of the wheel track).

2. State of the Prior Art

Previously known techniques for measuring roughness or evenness along a road track mainly comprise mechanical sensing techniques. During recent years optical techniques have also been put into use. For example, U.S. Pat. No. 4,653,316 discloses a vehicle comprising two attached laser devices longitudinally spaced in relation to each other, which devices emit light beams perpendicularly down towards the road surface. The light spots are read by corresponding detectors (focus detection).

U.S. Pat. No. 4,685,806 discloses a system in which stationary laser sources generate vertical and horizontal laser planes as a reference for a vehicle, which vehicle is equipped with "laser cameras" or the like, i.e. a transverse row of lasers/detectors or possibly ultrasound transducers directed down towards the road surface. A two-dimensional type mapping along the road track is thereby achieved, but the use of additional lasers for defining e.g. a horizontal plane is expensive and time-consuming.

SUMMARY OF THE INVENTION

The present invention utilizes only one single row of ultrasound transducers, which feature involves cost savings in relation to laser devices. Furthermore, the requirement for fixed reference planes is eliminated when the present invention is put into use, and the measurements can be made quickly and reliably.

In accordance with the present invention, this is achieved by adopting a method for measuring surface roughness along a longitudinal dimension of a traffic area, e.g. along a road. In the method a measuring apparatus is carried during use by a vehicle or a carriage trailing behind a vehicle, wherein control means (or control), an energizing means (or energizer) and a recording means (or a recorder) for executing the measurements, as well as measuring devices for trailer/vehicle speed and distance tranvelled, are brought along. The method is characterized in that during motion there are simultaneously emitted ultrasound waves down toward the surface of the traffic area from a number $N > 2$ of ultrasound transducers being located in a row on the underside of and along a straight bar which is arranged substantially parallel to the road surface on the trailer/vehicle and in a longitudinal direction. The ultrasound transducers are mounted an equal distance x between every two successive transducers, and each transducer receives an ultrasound echo from the surface which is due to that transducer's own emission.

Preferably the method is also characterized in that the measurements are constantly repeated during motion in such a manner that a new ultrasound wave emission is made when the trailer/vehicle has advanced a distance nx in relation to the preceding measurement, n being an integer and $n < N - 1$, so that an overlap with the preceding measurement is achieved.

According to another favourable feature of the present invention, the successive measurements made during motion are chained together after their recording by means of a pre-programmed computer to create a continuous elevation profile of the longitudinal dimension of the traffic area.

Preferably the ultrasound transducers are also tested for correct functioning by means of an automatically controlled comparison of measurement results at corresponding positions by overlap measurements.

The invention also relates to an apparatus for measuring surface roughness along the longitudinal dimension of the traffic area adapted to be placed in the vehicle/trailer, and comprising control means, energizing means and recording means for the measurements, as well as measuring devices for the trailer/vehicle speed and distance travelled. The apparatus is characterized by a straight bar arranged in the trailer/vehicle substantially parallel to the road surface and in the longitudinal direction, on the underside of and along which bar are located a number $N > 2$ of ultrasound transducers in a row, with an equal distance x between every two successive transducers, adapted for simultaneous emission during motion of ultrasound waves down toward the surface of said traffic area and capture of the reflected waves, each transducer being adapted to receive only that ultrasound echo which is due to its own emission.

Preferably the equipment also has one further ultrasound transducer arranged on the bar for correction with regard to changes in air pressure, temperature and humidity.

Preferably the equipment is adapted for repeated emission of ultrasound waves during motion in such a manner that a new emission is made from the ultrasound transducers when the trailer/vehicle has advanced a distance nx relative to the preceding measurement, n being an integer and $n < N - 1$, so that an overlap with the preceding measurement is achieved.

DESCRIPTION OF THE DRAWINGS

The present invention is further described below with reference to the accompanying drawings, wherein.

DETAILED DESCRIPTION OF THE PREFERRED EMBODIMENTS

The invention shall now be describe din closer detail, referring to the enclosed drawing figures. The figure show schematically a substantially horizontal bar I, arranged at a suitable distance about 20 cm above a road surface II. As an example, the bar has a length of 4 m, and in the disclosed embodiment the bar is equipped with 17 ultrasound transducers directed down toward the road surface. However, the number of transducers and the bar length may of course vary within wide limits.

As a starting point, it is supposed that the bar I is arranged in a position which is substantially parallel to the road surface and pointing in the movement direction of the vehicle/trailer on which the bar is suspended.

Ultrasound waves are emitted simultaneously from all transducers perpendicularly down toward the road surface, and the reflections which are detected give rise to signals which are recorded in recording equipment brought along. Typical parameters to be measured can be propagation time or phase shift for the received sound waves. Apparatus dimensions, distances and wave lengths are suitably selected in such a manner that unwanted influence upon neighboring transducers is minimized or can be removed during signal processing. Only that part of an ultrasound reflection passing substantially perpendicularly up to the emission transducer shall in principle be used in the measurement. The propagation velocity of the ultrasound waves is that much higher than the current driving velocities of the vehicle/trailer with the bar that no problems arise due to the fact that the transducers move while the ultrasound waves are in transit between the bar and the road surface. The distance between the transducers is 25 cm in the example shown. Thus the distance between the road surface and the 17 ultrasound transducers is measured simultaneously for all transducers while the bar is moving. In this way the apparatus can be used as an "automated straight edge". A calculation program may later convert the recorded data in such a manner that maximum sag is computed when the bar "touches" the surface in two ("touching is here only supposed to mean that those two positions in which the shortest distances are measured between bar and road surface, are used as a starting point).

Figure 1:
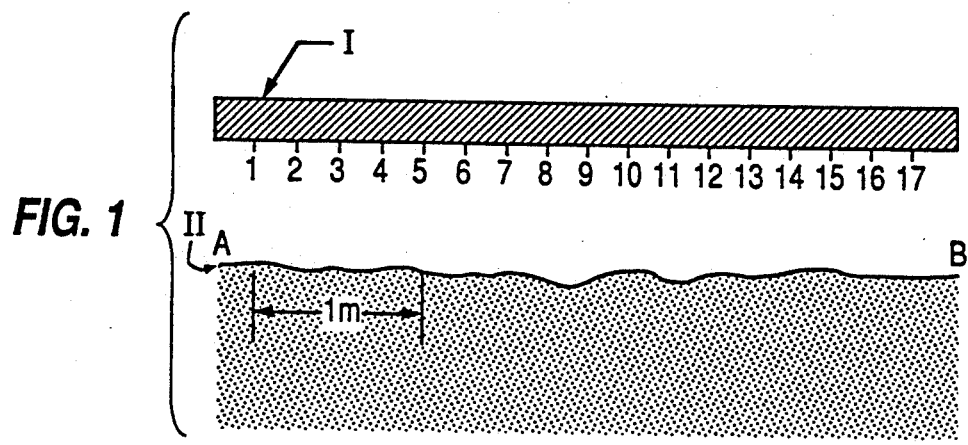
FIG. 1 schematically illustrates the apparatus according to the present invention at a first position of use.
Figure 2:
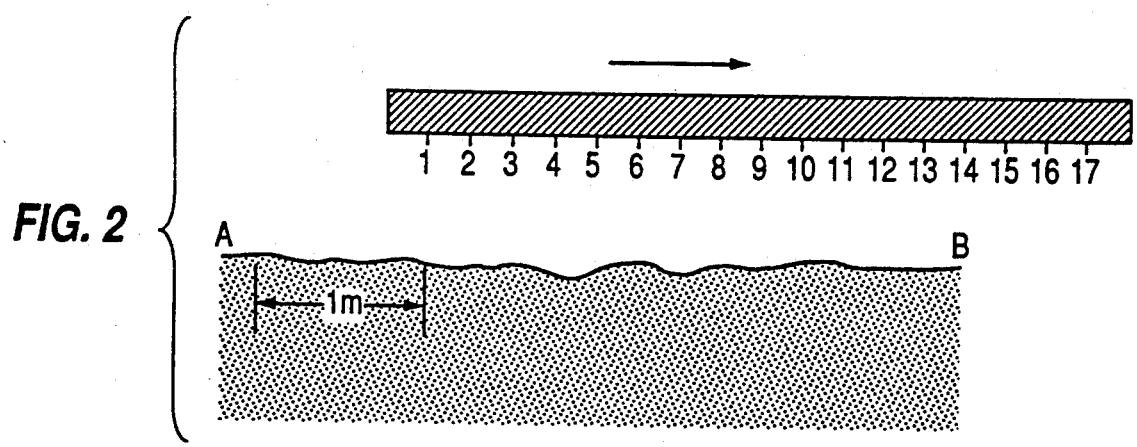
FIG. 2 illustrates the apparatus of FIG. 1 in a second position of the use.
Figure 3:
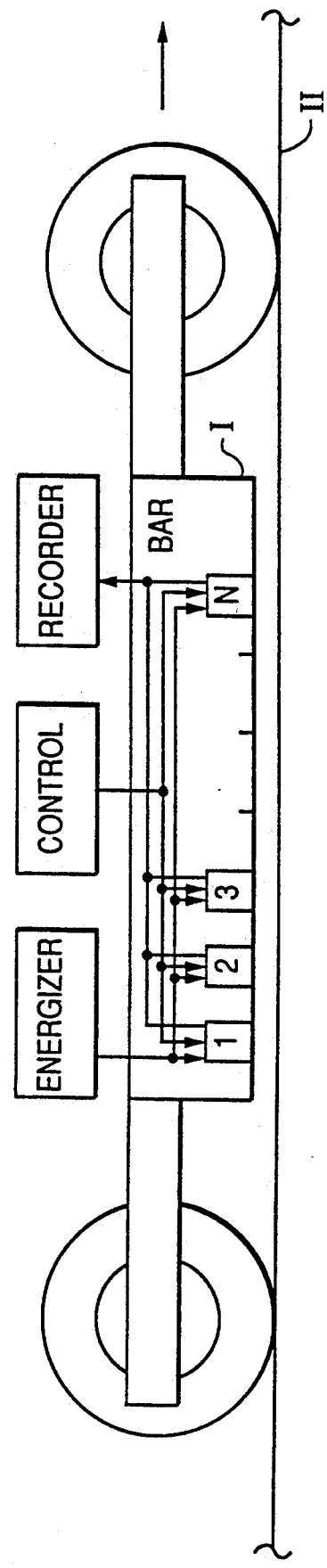
FIG. 3 schematically illustrates the invention mounted on a vehicle.

As shown in FIG. 3, an energizer for energizing the measuring apparatus, a control for controlling the measuring apparatus and a recorder for recording the measurement made by the measuring apparatus are provided.

The vehicle or trailer moves all the time towards the right side of the figure. A new measurement is made by simultaneous emission of ultrasound waves from all transducers when the bar is located at a distance to the right of the starting position, which is an integral multiple of the distance between two successive transducers. In the exemplified embodiment the distance from one transducer to the next one is 25 cm, and the interval between two successive measurements has been chosen to be equal to 4×25 cm=1 m. The choice of such a measuring interval is made taking into consideration both the wish for high accuracy, which implies a large degree of overlap, i.e. short intervals, and a fast accomplishment of measuring a long road distance, which implies an increased driving speed, requiring longer recording intervals. In the example shown, with intervals of 1 m, the practical maximum driving speed is in the area 40 km per hour. The overlap recording technique described above forms a basis for chaining together successive recordings by means of a computer into a continuous elevation profile of the surface, given in the form of computed "elevations" with a spacing equal to the fixed mutual spacing between the ultrasound transducers. The computed elevation values do not represent the real elevation above sea level, but can be used in order to describe irregularities with a wavelength up to 50 m. The computed elevation profile forms a basis for calculating different roughness indexes for the road surface.

The overlap measurements are also used in order to check that all transducers are working correctly. The overlapping part of the profile from two successive recordings must be identical (at least after executing corrections for a possible slanting of the whole bar relative to the foregoing recording), and this fact can be used to investigate if all transducers have been calibrated correctly. In the same manner it is also possible to study the accuracy of the measurements and how the accuracy is influenced by the texture of the road surface.

I claim:

1. A method for measuring the roughness of a surface, comprising:

providing a measuring apparatus with a vehicle for movement therewith, and further providing a control means for controlling said measuring apparatus, an energizing means for energizing said measuring apparatus and a recording means for recording measurements made by said measuring apparatus, wherein said measuring apparatus comprises a straight bar arranged substantially parallel to the surface and in a longitudinal direction having a number $N>3$ of ultrasound transducers located in a row therealong and on the underside thereof, said ultrasound transducers being mounted with an equal distance x between every two successive said transducers;

moving the vehicle along the surface such that said bar moves in the longitudinal direction and simultaneously emitting ultrasound waves down toward the surface from said number of ultrasound transducers; and receiving with each said transducer an ultrasound echo from the surface due that said ultrasound transducer's own ultrasound wave emission.

2. The method of claim 1, and further comprising:

repeating said emission and reception of ultrasound waves during movement of the vehicle each time the vehicle travels a distance nx relative to the location of the preceding said emission and reception, n being an integer preceding said emission and reception, n being an integer and $n>N-1$, such that the repeated said emission and reception overlaps with the preceding said emission and reception.

3. The method of claim 2, wherein $n<N-2$.

4. The method of claim 2, wherein successive said emissions and receptions are recorded by said recording means and chained together by a preprogrammed computer into a continuous elevation profile of the longitudinal dimension of the surface.

5. The method of claim 4, wherein said ultrasound transducers are checked for correct functioning by automatically controlled comparison of the results of said emissions and receptions at corresponding overlap positions of said ultrasound transducers.

6. The method of claim 2, wherein said ultrasound transducers are checked for correct functioning by automatically controlled comparison of the results of said emissions and receptions at corresponding overlap positions of said ultrasound transducers.

7. An apparatus for use with a vehicle for measuring the roughness of a surface, comprising:

a straight bar adapted to be arranged substantially parallel to the surface in a longitudinal direction for movement with the vehicle; and a number $N>3$ of measuring means for simultaneously emitting ultrasound waves during movement of the vehicle in the longitudinal direction down toward the surface and receiving only their respective reflected ultrasound wave echoes produced by their own emission, said number of measuring means being arranged in a row along the underside of said straight bar with an equal distance x between every two successive said measuring means, and a control means for controlling said number of measuring means, an energizing means for energizing said measuring means and a recording means for recording measurements made by said measuring means in the form of emissions and receptions of said ultrasound waves.

8. The apparatus of claim 7, wherein each said measuring means comprises an ultrasound transducer.

9. The apparatus of claim 8, and further comprising correction means on said bar for providing corrections with regard to changes in air pressure, temperature and humidity.

10. The apparatus of claim 9, wherein said correction means comprises an additional ultrasound transducer.

11. The apparatus of claim 10, wherein said number of measuring means, said control means and said energizing means are adapted for repeating the emission of ultrasound waves during motion of the vehicle such that a new emission and reflection are made from said number of measuring means when said straight bar has advanced a distance nx relative to the point of the preceding simultaneous emission and reception of ultrasound waves, n being an integer and $n < N-1$, such that the repeated simultaneous emission and reception overlaps with the preceding simultaneous emission and reception.

12. The apparatus of claim 11, wherein $n < N-2$.

13. The apparatus of claim 7, wherein said number of measuring means, said control means and said energizing means are adapted for repeating the emission of ultrasound waves during motion of the vehicle such that a new emission and reflection are made from said number of measuring means when said straight bar has advanced a distance nx relative to the point of the preceding simultaneous emission and reception of ultrasound waves, n being an integer and $n < N-1$, such that the repeated simultaneous emission and reception overlaps with the preceding simultaneous emission and reception.

14. The apparatus of claim 13, wherein $n < N-2$.

* * * * *